Patented June 26, 1923.

1,460,244

UNITED STATES PATENT OFFICE.

ARTHUR HEINEMANN, OF BERLIN-TEMPELHOF, GERMANY.

PROCESS FOR THE MANUFACTURE OF FORMALDEHYDE.

No Drawing.   Application filed June 12, 1922. Serial No. 567,808.

*To all whom it may concern:*

Be it known that I, ARTHUR HEINEMANN, citizen of the German Republic, residing at Berlin-Tempelhof, Dorfstrasse 23, Germany, have invented a certain new and useful Process for the Manufacture of Formaldehyde (for which I have made application in Germany, May 11, 1921), of which the following is a specification.

The invention has for its object the manufacture of formaldehyde from carbon dioxide and hydrogen.

It has become known from literature that carbon dioxide and hydrogen combine under certain circumstances, such as a gradual electric discharge, to a polymer of the formaldehyde. It has also become known that carbon dioxide with hydrogen in the presence of steam and in a very high temperature either atmospheric or increased pressure form small quantities of formaldehyde (see Comptes Rendus, volume 150, page 1568, and volume 151, page 358; J. C. S., volume 87, page 916).

It has been proved that the combination of hydrogen with carbon dioxide is quite possible in a technical yield if to the mixture of carbon dioxide and hydrogen small quantities of steam are added. This mixture of carbon dioxide, hydrogen and steam is passed over a contact substance which is heated to a temperature of about from 240 to 350 degrees centigrade. After the gases have passed through the device containing the contact substance the mixture of steam and formaldehyde is condensed and collected as a liquid solution of formaldehyde. Carbon dioxide and hydrogen gases which may not have been converted are recovered.

The process is carried out in such manner that about 2 litres of the gas mixture are passed per hour through a contact space of about 750 c. c. capacity. As a contact substance porous materials such as unglazed porcelain, pumice stone, asbestos, coke, charcoal, and artificial carbon, may be used.

In order to obtain the greatest possible yield of formaldehyde it is preferable to provide the contact substances with a metallic deposit of copper, nickel and the like which are capable of occluding hydrogen.

I claim as my invention—

1. A process for the manufacture of formaldehyde from carbon dioxide and hydrogen, wherein carbon dioxide and hydrogen in the presence of steam are passed over porous substances at a temperature of about from 240 to 350 degrees centigrade.

2. A process according to claim 1, wherein the porous contact substances are provided with metallic deposits.

In testimony whereof I have hereunto set my hand.

ARTHUR HEINEMANN.

Witnesses:
E. HOLTZERMAN,
R. G. ANSPACH.